Oct. 6, 1931. S. SCHWARTZ Re. 18,222

NECKTIE

Original Filed Oct. 23, 1928 3 Sheets-Sheet 1

Samuel Schwartz
INVENTOR.

BY Mock & Blum
ATTORNEYS.

Oct. 6, 1931. S. SCHWARTZ Re. 18,222

NECKTIE

Original Filed Oct. 23, 1928 3 Sheets-Sheet 2

Samuel Schwartz
INVENTOR.

BY Mock & Blum
ATTORNEYS.

Oct. 6, 1931. S. SCHWARTZ Re. 18,222

NECKTIE

Original Filed Oct. 23, 1928 3 Sheets-Sheet 3

Samuel Schwartz
INVENTOR.

BY Mock + Blum
ATTORNEYS.

Reissued Oct. 6, 1931

Re. 18,222

UNITED STATES PATENT OFFICE

SAMUEL SCHWARTZ, OF ALBANY, NEW YORK, ASSIGNOR TO SI-WO CORPORATION, A DOMESTIC CORPORATION OF NEW YORK

NECKTIE

Original No. 1,741,345, dated December 31, 1929, Serial No. 314,442, filed October 23, 1928. Application for reissue filed June 23, 1931. Serial No. 546,399.

My invention relates to a new and improved necktie and method of making the same.

One of the objects of my invention is to provide an improved necktie which shall not require a filler or lining strip.

Another object of my invention is to provide a necktie made of a composite interwoven fabric which can be simply and economically manufactured.

Another object of my invention is to provide an improved necktie having a face fabric of relatively thin and expensive material such as silk, and a relatively cheap and heavy fabric such as worsted, for example.

Another object is to provide a necktie of this type which is constructed so that it will not lose its shape, and can be readily ironed.

Other objects of my invention will be set forth in the following description and drawings which illustrate a preferred embodiment thereof, it being understood that the above general statement of the objects of my invention is intended merely to generally explain the same and not to limit it in any manner.

Figure 1:
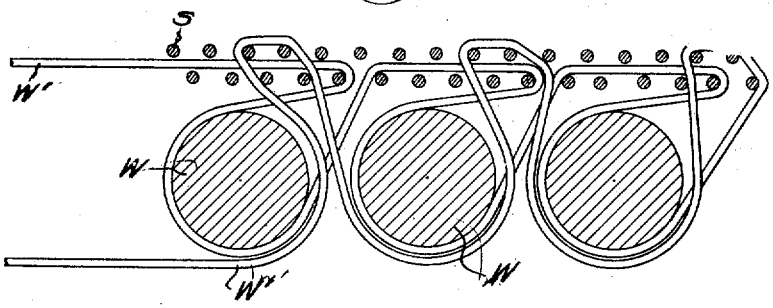
Fig. 1 illustrates a first embodiment of my invention employing that type of weave which is called the "taffeta" weave by the trade.
Figure 2:
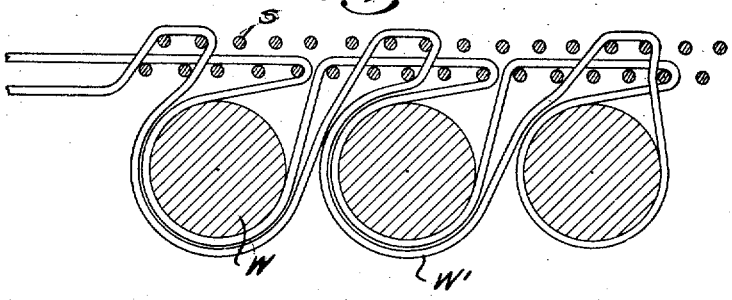
Figs. 2 and 3 illustrate the same weave shown in Fig. 1, and they show consecutive stages in the interweaving of the fabrics to form the composite fabric.
Figure 3:
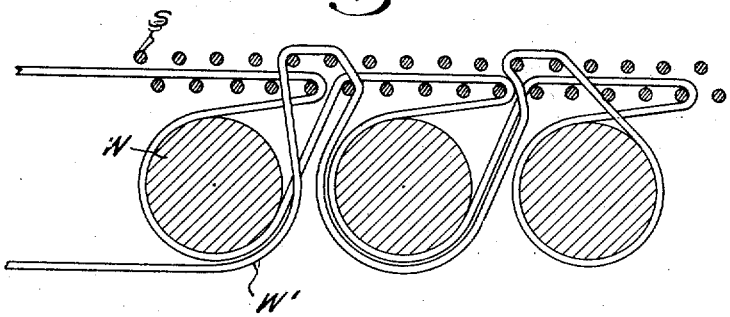
Figure 4:
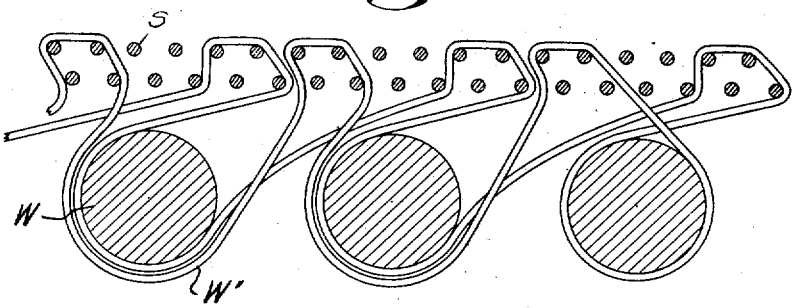
Figure 5:
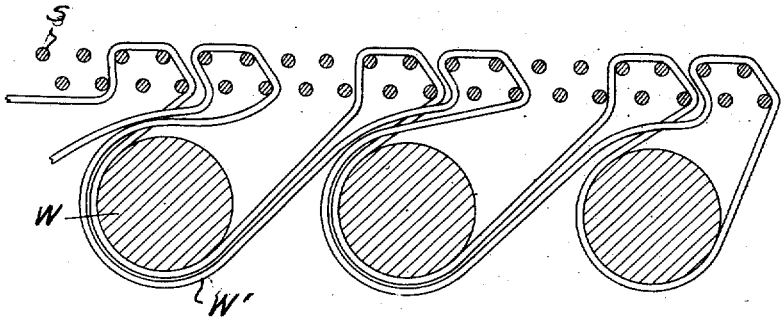
Figure 6:
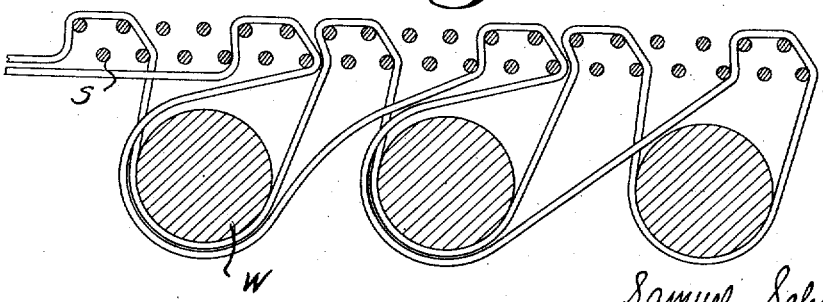

Figs. 4–6 inclusive are similar to Figs. 1–3 inclusive. They illustrate that type of weave designated by the trade as the "serge" type.

Figure 7:
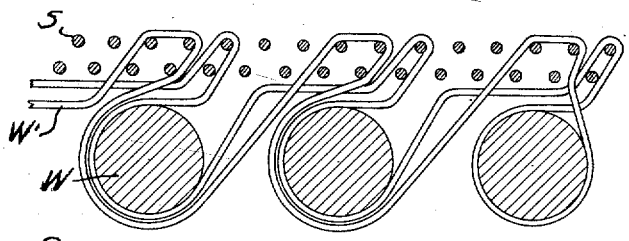
Figure 8:
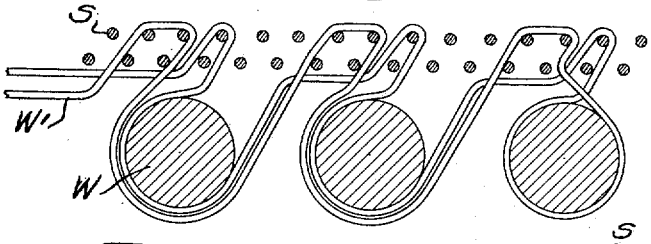
Figure 9:
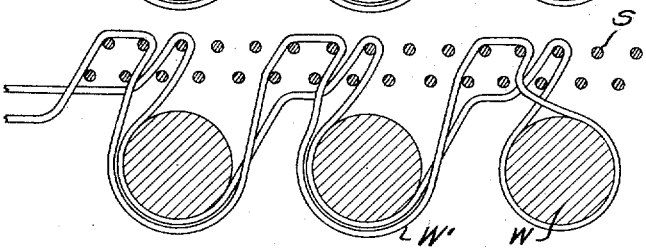

Figs. 7–9 inclusive are similar to Figs. 1–3. They illustrate the use of what is known in the trade as the "satin" weave.

Figure 10:
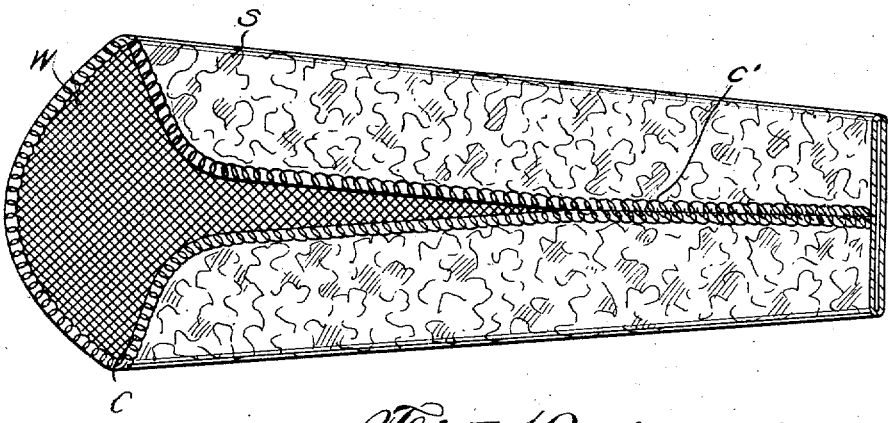

Fig. 10 is a rear view of a necktie constructed according to the invention.

It has heretofore been customary to provide filler or lining strips for neckties. The use of these filler or lining strips added to the expense of making the necktie and made it difficult to iron the necktie.

According to my invention, the necktie consists of a composite fabric which preferably comprises a silk facing and a worsted backing, which is interwoven with the said silk facing. The weft thread is also preferably made of worsted. The relatively thin silk warp threads S may be considered as being divided into groups each of which corresponds to a relatively thick thread W made of worsted. This can be done by arranging the silk threads S in an upper warp, and by arranging the worsted threads W in a lower warp, each group of the silk threads S corresponding to a worsted thread W comprising a single group of the reed.

While I do not wish to restrict myself to any particular thickness or type of silk thread or of worsted thread, I have found it suitable to have each silk thread S consist of three-thread silk of any suitable type such as that known in the trade as "organzine" from No. 40—45 Denier gage. The thickness of this thread is equal to that of ordinary 120 cotton thread, it being understood that No. 1 cotton thread has 840 yards to the pound. The worsted thread W is preferably No. 50-two ply worsted yarn which is warp twisted, having from twenty to twenty-six turns to the inch.

I prefer to arrange the silk threads in the upper warp so that there will be 400 of such threads per inch, while there will be about 40 of the worsted threads W per inch. In other words, each worsted thread W will correspond to a group of ten silk threads S.

In the embodiment shown in Figs. 1–3, the taffeta type of weave is employed in which the weft thread W′ divides each group of silk threads S into two sub-groups having equal numbers.

For example, considering Fig. 1, the weft thread W′ passes between the first group of ten silk threads S so as to form an upper sub-group of five threads and a lower sub-group of five threads. The said weft thread W′ then passes around the first worsted thread W and it continues to form the weave previously mentioned until it has reached the end of the warp.

Upon the return stroke of the shuttle, that type of weave which is designated in the trade as the "serge" type is formed. In the "serge" type of weave, the weft thread W′ engages one-third of the silk threads S. For example, in the return stroke of the shuttle, it may be assumed that the silk threads are divided into groups of twelve and that the weft thread W′ engages four silk threads out of each said group of twelve. The weft thread W′ passes around each worsted thread W, upon the return stroke thereof. This type of weave is completed in the ordinary manner as shown in Figs. 2 and 3 by causing the weft thread to pass around different sub-groups of the silk threads, to complete the connection between all the silk threads, and all the worsted threads.

In the embodiment shown in Figs. 4 and 6, the forward stroke of the shuttle forms what is known as the "serge" type of weave, in which the weft thread W′ engages one-third of the silk threads S. The return weave is also a "serge" weave, and the weaving of the fabric is completed with this type of weave in the well known manner, as shown in Figs. 5 and 6.

In the embodiment shown in Figs. 7–9, the "satin" type of weave is employed in the forward stroke of the shuttle. In this embodiment it may be assumed that the silk threads are divided in groups of ten, and that two threads of each said group of ten are interlaced by the worsted weft thread W′, in the forward stroke of the shuttle. The "serge" type of weave is also employed in the rearward stroke of the shuttle. The composite fabric thus formed is cut into suitable shape and it is turned and the edges thereof are finished with a suitable overcast stitch C, as shown in Fig. 10.

The edge portion of the fabric, upon which the stitches C are located, are then connected by suitable transverse stitches C′. The said transverse stitches C′ therefore pass through the stitches C. When the tubular necktie thus formed is laid flat, the stitches C′ do not protrude so that it is very easy to iron the tie. As shown in Fig. 10, the stitches C′ do not pass through the fabric itself. On the contrary, they only pass through the stitches C which project slightly from the edges of the fabric.

By selecting a backing material of sufficient weight, a strong and durable necktie is provided which keeps its shape for a long time. Silk crushes or wrinkles very easily. Worsted is a relatively resilient and noncrushable material. Hence, the composite necktie retains its shape for a long time.

It is to be understood that the illustrations of the weave are diagrammatic, because the worsted weft thread W′ is concealed by the silk threads S. That is, in actual practice, successive portions of the filler thread are straight, and they are arranged laterally to the length of the cloth. The drawings are intended to merely diagrammatically indicate that the silk facing comprises silk warp threads interwoven with a weft thread, that the wool backing consists of wool warp threads, interwoven with a weft thread, and that both said layers are sufficiently interlocked or interwoven to impart to the silk face layer the resistance to crushing of the back layer. Numerous well known types of weaves would be effective for this purpose.

For example, it is not necessary that the backing should be made wholly of wool, or that the warp threads and the weft threads of the backing should be made of the same material, as long as a separate lining or filler is unnecessary in the knot-forming portion of the necktie. Hence, whenever I refer to a wool or worsted backing, either in the description or in the claims, I do not wish to be limited to a backing made wholly of wool or of worsted.

It will be noted that the filler is made of worsted material of sufficient weight to add about 33% to the weight, thickness and life of the material.

I prefer to cut the composite material made as previously described, on the bias, in forming the necktie. This renders the composite material practically non-crushable. It is particularly advantageous to eliminate the use of a separate lining or filler, because the necktie can be pressed and dry-cleaned as often as desired and stains can be removed therefrom. Since the material is cut on the bias, it is stretchable. Likewise, the stitches C′ can stretch because they pass through the loops of the overcast stitches. It would not be departing from the invention if said stitches C′ penetrated the extreme edges of the fabric because said finishing stitches C′ could still stretch.

Likewise, the absence of a projecting seam, makes it easy to iron the necktie.

I have shown a preferred embodiment of my invention, but it is clear that numerous changes and omissions can be made without departing from the spirit of my invention.

I claim:

1. A necktie made of a composite fabric having a face fabric of relatively crushable material and a backing of relatively non-crushable material which is interwoven with said face fabric, said fabric being sufficiently heavy to make a separate filler piece unnecessary, said necktie having its edges stitched together.

2. A necktie made of a composite fabric having a face fabric of relatively crushable material and a backing of relatively non-crushable material which is interwoven with said face fabric by relatively non-crushable thread, said necktie having its edges stitched together.

3. A necktie made of a composite fabric having a silk facing and a wool backing interwoven with said silk facing, the edges of said necktie being stitched together.

4. A necktie made of a composite fabric having a silk facing and a wool backing interwoven with said silk facing by wool thread, the edges of said necktie being stitched together.

In testimony whereof, I affix my signature.

SAMUEL SCHWARTZ.